US009659222B2

(12) United States Patent
Tsai

(10) Patent No.: US 9,659,222 B2
(45) Date of Patent: May 23, 2017

(54) VEHICLE EVENT DATA RECORDER AND OPERATION METHOD THEREOF

(71) Applicant: Novatek Microelectronics Corp., Hsinchu (TW)

(72) Inventor: Jung-Che Tsai, Hsinchu County (TW)

(73) Assignee: Novatek Microelectronics Corp., Hsinchu (TW)

(*) Notice: Subject to any disclaimer, the term of this patent is extended or adjusted under 35 U.S.C. 154(b) by 404 days.

(21) Appl. No.: 14/534,175

(22) Filed: Nov. 6, 2014

(65) Prior Publication Data

US 2016/0063331 A1 Mar. 3, 2016

(30) Foreign Application Priority Data

Sep. 2, 2014 (TW) .............................. 103130250 A

(51) Int. Cl.
*G06K 9/00* (2006.01)
*G06F 17/30* (2006.01)
*G06K 9/32* (2006.01)

(52) U.S. Cl.
CPC ... *G06K 9/00791* (2013.01); *G06F 17/30858* (2013.01); *G06K 9/00744* (2013.01); *G06K 9/3216* (2013.01); *G06K 2209/15* (2013.01)

(58) Field of Classification Search
CPC .......... G06K 9/00791; G06K 9/00744; G06K 9/3216; G06K 2209/15; G06F 17/30858
See application file for complete search history.

(56) References Cited

U.S. PATENT DOCUMENTS 7,986,812 B2 * 7/2011 Furusawa ............ G06K 9/2054
348/208.99

FOREIGN PATENT DOCUMENTS

| JP | 2004-048295 | 2/2004 |
| TW | M348034 | 1/2009 |
| TW | I448976 | 8/2014 |

OTHER PUBLICATIONS

"Office Action of Taiwan Counterpart Application", issued on May 10, 2016, p. 1-p. 5.

* cited by examiner

*Primary Examiner* — Nam Pham
(74) *Attorney, Agent, or Firm* — Jianq Chyun IP Office

(57) ABSTRACT

A vehicle event data recorder and an operation method thereof are provided. The vehicle event data recorder includes a photography module, a database, a first image-processing circuit and a second image-processing circuit. The photography module is configured to capture the scene and output an original video frame. The first image-processing circuit generates a first video frame according to part or all of the original video frame, and records the first video frame into a database. The second image-processing circuit generates a second video frame according to part or all of the original video frame, and records the second video frame into the database. Wherein, the view angle of the second video frame is different from the view angle of the first video frame.

18 Claims, 2 Drawing Sheets

VEHICLE EVENT DATA RECORDER AND OPERATION METHOD THEREOF

CROSS-REFERENCE TO RELATED APPLICATION

This application claims the priority benefit of Taiwan application serial no. 103130250, filed on Sep. 2, 2014. The entirety of the above-mentioned patent application is hereby incorporated by reference herein and made a part of this specification.

BACKGROUND OF THE INVENTION

Field of the Invention

The invention relates to a photographic device, and more particularly, to a vehicle event data recorder and an operation method thereof.

Description of Related Art

A conventional vehicle event data recorder usually records video frames at only a single view angle. If video frames are intended to be recorded at different view angles, it is necessary to dispose a plurality of photography modules (a plurality of sets of lenses and a plurality of image sensors) in the vehicle event data recorder. For example, if video frames are intended to be recorded at a distant view angle and a near view angle at the same time, it is necessary to dispose a tele photography module and a wide-angle photography module in the vehicle event data recorder. The tele photography module includes a set of tele lenses and an image sensor for capturing a tele image. The wide-angle photography module includes a set of wide lenses and another image sensor for capturing a wide image. In any case, since two sets of lenses and two image sensors are required for such design, costs are increased accordingly.

SUMMARY OF THE INVENTION

The invention provides a vehicle event data recorder and an operation method thereof, by which video frames may be captured at several different view angles using a single lens.

The vehicle event data recorder according to embodiments of the invention includes a photography module, a database, a first image-processing circuit and a second image-processing circuit. The photography module is configured to capture a scene and output an original video frame. The first image-processing circuit is coupled to the photography module to receive the original video frame. The first image-processing circuit generates a first video frame according to part or all of the original video frame, and records the first video frame into the database. The second image-processing circuit is coupled to the photography module to receive the original video frame. The second image-processing circuit generates a second video frame according to part or all of the original video frame, and records the second video frame into the database. In the above, a view angle of the second video frame is different from a view angle of the first video frame.

The operation method of a vehicle event data recorder according to the embodiments of the invention includes the following steps. A scene is captured and an original video frame is generated by a photography module. A first video frame is generated according to part or all of the original video frame and is recorded into a database by a first image-processing circuit. A second video frame is generated according to part or all of the original video frame and is recorded into the database by a second image-processing circuit. In the above, a view angle of the second video frame is different from a view angle of the first video frame.

Based on the above, the vehicle event data recorder and the operation method thereof according to the embodiments of the invention make it possible to provide the original video frame generated by the same photography module to different image-processing circuits at the same time. These different image-processing circuits respectively capture the original video frame at different view angles and generate different video frames. Therefore, the vehicle event data recorder and the operation method thereof make it possible to capture video frames at several different view angles using a single lens.

To make the above features and advantages of the invention more comprehensible, embodiments accompanied with drawings are described in detail as follows.

DESCRIPTION OF DISCLOSED EMBODIMENTS

Figure 1:
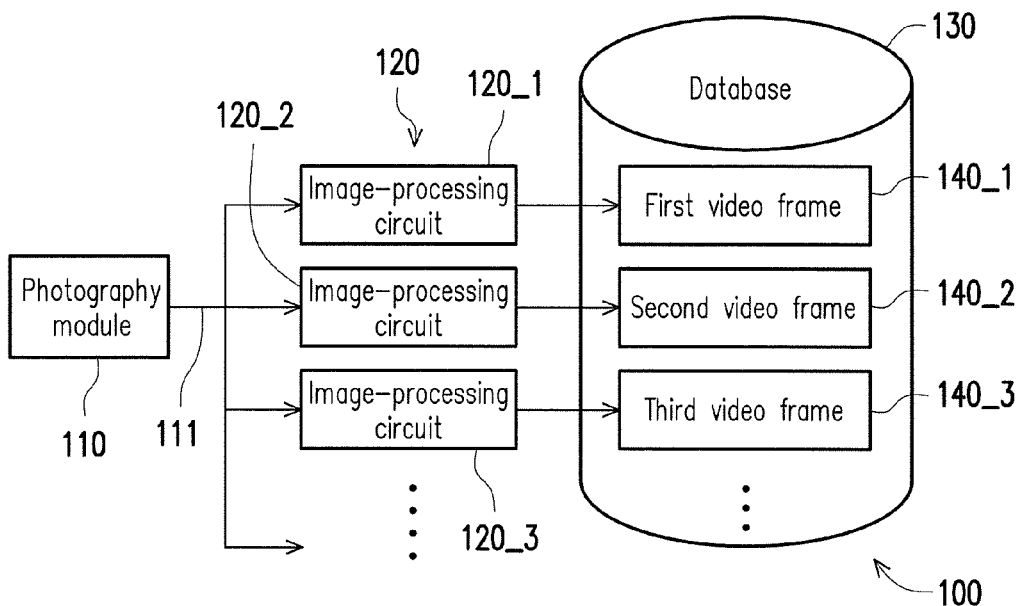
FIG. 1 is a schematic circuit block diagram of a vehicle event data recorder according to an embodiment of the invention.

The term "coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a schematic circuit block diagram of a vehicle event data recorder 100 according to an embodiment of the invention. The vehicle event data recorder 100 includes a photography module 110, a plurality of image-processing circuits 120 and a database 130. In the embodiment shown in FIG. 1, the image-processing circuits 120 include a first image-processing circuit 120_1, a second image-processing circuit 120_2 and a third image-processing circuit 120_3. In some embodiments, the first image-processing circuit 120_1, the second image-processing circuit 120_2 and the third image-processing circuit 120_3 are integrated into the same integrated circuit. In some other embodiments, the first image-processing circuit 120_1, the second image-processing circuit 120_2 and/or the third image-processing circuit 120_3 are implemented as different integrated circuits. In any case, the number of the image-processing circuits 120 is determined by design requirements. For example, in some embodiments, the number of the image-processing circuits 120 is two. In some other embodiments, the number of the image-processing circuits 120 is four or more.

The photography module 110 is configured to capture a scene and outputs an original video frame 111. The first image-processing circuit 120_1 is coupled to the photography module 110 to receive the original video frame 111. The first image-processing circuit 120_1 is configured to generate a first video frame 140_1 according to part or all of the original video frame 111, and records the first video frame 140_1 into the database 130. The second image-processing circuit 120_2 is coupled to the photography module 110 to receive the original video frame 111. The second image-processing circuit 120_2 generates a second video frame 140_2 according to part or all of the original video frame 111, and records the second video frame 140_2 into the database 130, wherein a view angle of the second video frame 140_2 is different from that of the first video frame 140_1. The third image-processing circuit 120_3 is coupled to the photography module 110 to receive the original video frame 111. The third image-processing circuit 120_3 generates a third video frame 140_3 according to part or all of the original video frame 111, and records the third video frame 140_3 into the database 130, wherein a view angle of the third video frame 140_3 is different from those of the first video frame 140_1 and the second video frame 140_2.

In some embodiments, the image-processing circuits 120_1, 120_2 and/or 120_3 have an image scaling function for adjusting resolution of the video frames 140_1, 140_2 and/or 140_3. Thus, resolution of the original video frame 111 may be lower than resolution of the video frames 140_1, 140_2 and/or 140_3.

In some other embodiments, based on design requirements or other considerations, the image-processing circuits 120_1, 120_2 and/or 120_3 have an image cropping/capturing function for cropping/capturing from the original video frame 111 a part of sub-frames as the video frames 140_1, 140_2 and/or 140_3. Thus, the resolution of the original video frame 111 may be higher than resolution of the video frames 140_1, 140_2 and/or 140_3.

In some other embodiments, the original video frame 111 is a wide image. The image-processing circuits 120_1, 120_2 and 120_3 crop/capture different parts of the original video frame 111 to obtain a first sub-frame, a second sub-frame and a third sub-frame respectively. The image-processing circuits 120_1, 120_2 and 120_3 adjust resolution of the first sub-frame, the second sub-frame and the third sub-frame, so as to obtain the video frames 140_1, 140_2 and 140_3 respectively. The video frames 140_1, 140_2 and 140_3 may be provided at, e.g., high-definition (HD) resolution, full high-definition (Full-HD) resolution or other resolution. However, the invention is not limited thereto.

For example, when the image-processing circuits 120_1, 120_2 and 120_3 (or more image-processing circuits) access the database 130 through a data bus, the database 130 and the data bus may only provide limited bandwidth resources. In addition, the database 130 has limited storage space. To enable effective sharing of the bandwidth resources and/or storage space provided by the database 130 between the image-processing circuits, the image-processing circuits 120_1, 120_2 and 120_3 respectively crop/capture different parts of the original video frame 111 to obtain the video frames 140_1, 140_2 and 140_3. The image-processing circuits 120_1, 120_2 and 120_3 respectively adjust the resolution of the video frames 140_1, 140_2 and 140_3, so as to make the resolution of the video frames 140_1, 140_2 and 140_3 lower than that of the original video frame 111. Since the resolution of the video frames 140_1, 140_2 and 140_3 can be lowered, the bandwidth resources provided by the database 130 are able to meet bandwidth requirements for recording the video frames 140_1, 140_2 and 140_3 into the database 130. Thus, the image-processing circuits 120_1, 120_2 and 120_3 effectively share the bandwidth resources and/or storage space provided by the database 130 with one another, so as to store the video frames 140_1, 140_2 and 140_3 into the database 130 in real time.

To simplify the explanation, the image-processing circuits 120_1, 120_2 and the video frames 140_1, 140_2 are described hereinafter for exemplary purposes. Details of other image-processing circuits (e.g., the third image-processing circuit 120_3) may be deduced by analogy from the descriptions of the image-processing circuit 120_1 or 120_2, and details of other video frames (e.g., the third video frame 140_3) may be deduced by analogy from the descriptions of the video frame 140_1 or 140_2.

Figure 2:
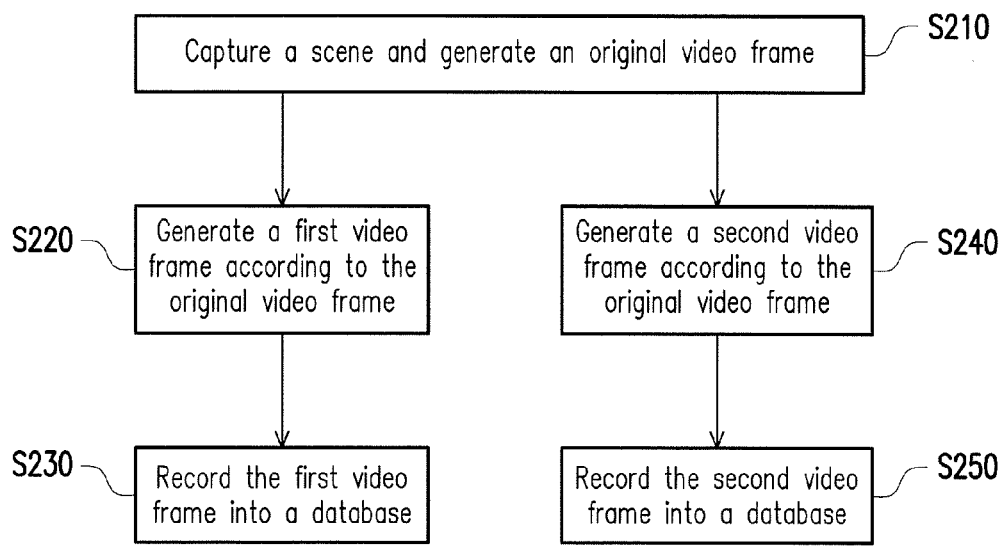
FIG. 2 is a schematic flow chart of an operation method of a vehicle event data recorder according to an embodiment of the invention.

FIG. 2 is a schematic flow chart of an operation method of a vehicle event data recorder according to an embodiment of the invention. Referring to FIG. 1 and FIG. 2, in step S210, the photography module 110 captures a scene and outputs the original video frame 111 to the first image-processing circuit 120_1, the second image-processing circuit 120_2, the third image-processing circuit 120_3 and other image-processing circuits.

The first image-processing circuit 120_1 generates the first video frame 140_1 according to part or all of the original video frame 111 (step S220), and records the first video frame 140_1 into the database 130 (step S230). The resolution of the first video frame 140_1 is different from (or the same as) that of the original video frame 111. In some embodiments, the first image-processing circuit 120_1 captures all of the original video frame 111 to obtain the first video frame 140_1. In some other embodiments, in step S220, the first image-processing circuit 120_1 captures part of the original video frame 111 to obtain the first sub-frame, and adjusts the resolution of the first sub-frame to obtain the first video frame 140_1.

The second image-processing circuit 120_2 generates the second video frame 140_2 according to part or all of the original video frame 111 (step S240), and records the second video frame 140_2 into the database 130 (step S250). The resolution of the second video frame 140_2 is different from (or the same as) that of the original video frame 111. In some embodiments, the second image-processing circuit 120_2 captures all of the original video frame 111 to obtain the second video frame 140_2. In some other embodiments, in step S240, the second image-processing circuit 120_2 captures part of the original video frame 111 to obtain the second sub-frame, and adjusts the resolution of the second sub-frame to obtain the second video frame 140_2. Since the image-processing circuits 120_1 and 120_2 respectively crop/capture different parts of the same original video frame 111, the view angle of the second video frame 140_2 is different from that of the first video frame 140_1.

In some embodiments, in step S220, the first image-processing circuit 120_1 performs image recognition to find out an object (e.g., a vehicle, a license plate, a human face or other feature image or object of interest) on the original video frame 111, and captures the first sub-frame including the object from the original video frame 111. The first image-processing circuit 120_1 adjusts the resolution of the first sub-frame to obtain the first video frame 140_1. For example, the first image-processing circuit 120_1 performs image recognition to find out the position of a license plate of a vehicle on the original video frame 111. Next, the first image-processing circuit 120_1 captures a part of the original video frame 111 that includes the license plate to obtain the first sub-frame. The first image-processing circuit 120_1 adjusts the resolution of the first sub-frame to obtain the first video frame 140_1. That is, the first image-processing circuit 120_1 enlarges the part of the license plate on the original video frame 111 to obtain the first video frame 140_1.

In some other embodiments, in step S220, the first image-processing circuit 120_1 generates the first video frame 140_1 according to all of the original video frame 111. For example, the first image-processing circuit 120_1 captures all of the original video frame 111, and adjusts the resolution of the captured frame to obtain the first video frame 140_1. Meanwhile, in step S220, the first image-processing circuit 120_1 performs image recognition to find out the position of an object (e.g., a vehicle, a license plate, a human face or other feature image or object of interest) on the original video frame 111, and provides the position of the object to the second image-processing circuit 120_2. In step S240, according to the position of the object provided by the first image-processing circuit 120_1, the second image-processing circuit 120_2 captures the second sub-frame including the object from the original video frame 111 to obtain the second video frame 140_2.

Figure 3:
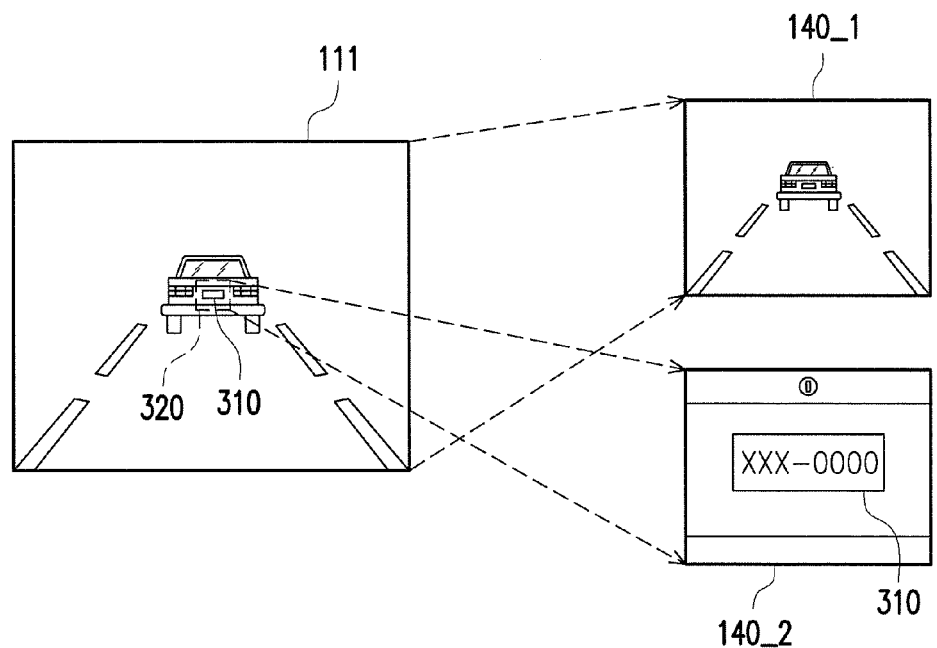
FIG. 3 is a schematic diagram showing an example of a video frame captured by the vehicle event data recorder in FIG. 1 according to an embodiment of the invention.

For example, FIG. 3 is a schematic diagram showing an example of a video frame captured by the vehicle event data recorder 100 in FIG. 1 according to an embodiment of the invention. In step S210, the photography module 110 captures the scene and outputs the original video frame 111 to the first image-processing circuit 120_1 and the second image-processing circuit 120_2. The original video frame 111 may be an image with any resolution higher than high-definition (HD) resolution. In step S220, the first image-processing circuit 120_1 captures all of the original video frame 111, and adjusts the resolution of the captured frame to obtain the first video frame 140_1. Here, it is presumed that the resolution of the first video frame 140_1 is high-definition (HD) resolution. The first image-processing circuit 120_1 performs image recognition to find out the position of a license plate 310 of a vehicle, and provides the position of the license plate 310 to the second image-processing circuit 120_2. According to the position of the license plate 310 provided by the first image-processing circuit 120_1, the second image-processing circuit 120_2 captures a part of the original video frame 111 that includes the license plate 310 to obtain a second sub-frame 320. The second image-processing circuit 120_2 adjusts the resolution of the second sub-frame 320 to obtain the second video frame 140_2. Here, it is presumed that the resolution of the second video frame 140_2 is high-definition (HD) resolution. That is, the second image-processing circuit 120_2 enlarges the part of the license plate 310 on the original video frame 111 to obtain the second video frame 140_2.

In summary, the vehicle event data recorder 100 and the operation method thereof according to the embodiments of the invention make it possible to provide the original video frame 111 generated by the same photography module 110 to the different image-processing circuits 120_1, 120_2 and 120_3 at the same time. The different image-processing circuits 120_1, 120_2 and 120_3 respectively capture the original video frame 111 at different view angles and generate the different video frames 140_1, 140_2 and 140_3. Therefore, the vehicle event data recorder 100 and the operation method thereof make it possible to capture video frames at several different view angles using a single lens.

Figure 4:
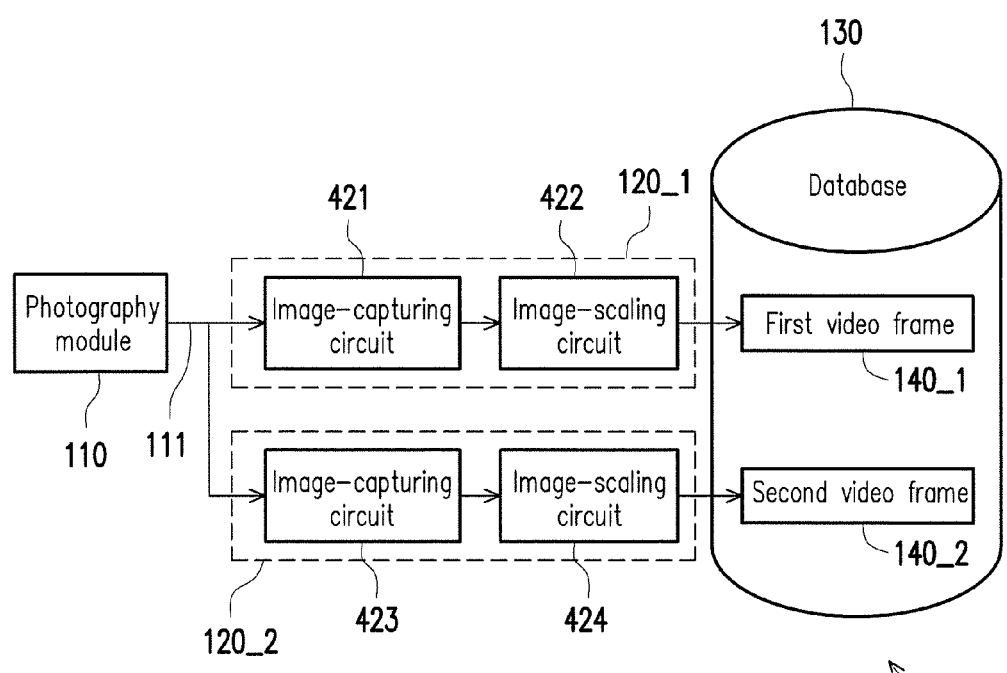
FIG. 4 is a schematic circuit block diagram of a vehicle event data recorder according to another embodiment of the invention.

FIG. 4 is a schematic circuit block diagram of a vehicle event data recorder 400 according to another embodiment of the invention. Details of the vehicle event data recorder 400 in FIG. 4 may be deduced by analogy from the descriptions of the vehicle event data recorder 100 in FIG. 1 and the descriptions of FIG. 2 and FIG. 3. The vehicle event data recorder 400 includes the photography module 110, the first image-processing circuit 120_1, the second image-processing circuit 120_2 and the database 130. In the embodiment shown in FIG. 4, the first image-processing circuit 120_1 includes a first image-capturing circuit 421 and a first image-scaling circuit 422, and the second image-processing circuit 120_2 includes a second image-capturing circuit 423 and a second image-scaling circuit 424.

An input terminal of the first image-capturing circuit 421 is coupled to the photography module 110 to receive the original video frame 111. The first image-capturing circuit 421 captures the first sub-frame from the original video frame 111. An input terminal of the first image-scaling circuit 422 is coupled to an output terminal of the first image-capturing circuit 421. The first image-scaling circuit 422 adjusts the resolution of the first sub-frame to obtain the first video frame 140_1.

An input terminal of the second image-capturing circuit 423 is coupled to the photography module 110 to receive the original video frame 111. The second image-capturing circuit 423 captures the second sub-frame from the original video frame 111. An input terminal of the second image-scaling circuit 424 is coupled to an output terminal of the second image-capturing circuit 423. The second image-scaling circuit 424 adjusts the resolution of the second sub-frame to obtain the second video frame 140_2.

In some embodiments, the first image-capturing circuit 421 performs image recognition to find out an object (e.g., a license plate of a vehicle or other feature image or object of interest) on the original video frame 111, and captures the first sub-frame including the object from the original video frame 111. The first image-scaling circuit 422 adjusts the resolution of the first sub-frame to obtain the first video frame 140_1. The second image-capturing circuit 423 performs image recognition to find out another object (e.g., a human face or other object) on the original video frame 111. Next, the second image-capturing circuit 423 captures a part of the original video frame 111 that includes the another object to obtain the second sub-frame. The second image-scaling circuit 424 adjusts the resolution of the second sub-frame to obtain the second video frame 140_2.

In some other embodiments, the first image-capturing circuit 421 captures all of the original video frame 111, and the first image-scaling circuit 422 adjusts the resolution of the captured frame to obtain the first video frame 140_1. Meanwhile, the first image-capturing circuit 421 performs image recognition to find out the position of an object (e.g., a vehicle, a license plate, a human face or other feature image or object of interest) on the original video frame 111, and provides the position of the object to the second image-capturing circuit 423. According to the position of the object provided by the first image-capturing circuit 421, the second image-capturing circuit 423 captures the second sub-frame including the object from the original video frame 111, and the second image-scaling circuit 424 adjusts the resolution of the second sub-frame to obtain the second video frame 140_2.

In summary, the vehicle event data recorder 400 and the operation method thereof according to the embodiments of the invention make it possible to provide the original video frame 111 generated by the same photography module 110 to the different image-processing circuits 120_1 and 120_2 at the same time. The different image-processing circuits 120_1 and 120_2 respectively capture the original video frame 111 at different view angles and generate the different video frames 140_1 and 140_2. Therefore, the vehicle event data recorder 400 and the operation method thereof make it possible to capture video frames at several different view angles using a single lens.

Although the invention has been described with reference to the above embodiments, it will be apparent to persons of ordinary skill in the art that modifications to the described embodiments may be made without departing from the spirit of the invention. Accordingly, the scope of the invention will be defined by the attached claims and not by the above detailed descriptions.

What is claimed is:

1. A vehicle event data recorder, comprising:
   a photography module, configured to capture a scene and output an original video frame;
   a first image-processing circuit, coupled to the photography module to directly receive the original video frame from the photography module, configured to capture the original video frame at a first view angle to generate a first video frame, and recording the first video frame into a database; and
   a second image-processing circuit, coupled to the photography module to directly receive the original video frame from the photography module, configured to capture the original video frame at a second view angle to generate a second video frame, and recording the second video frame into the database, wherein the second view angle of the second video frame is different from the first view angle of the first video frame,
   wherein the first image-processing circuit and the second image-processing circuit simultaneously receive the original image data.

2. The vehicle event data recorder of claim 1, wherein the first image-processing circuit and the second image-processing circuit respectively adjust resolution of the first video frame and resolution of the second video frame to make the resolution of the first video frame and the resolution of the second video frame lower than resolution of the original video frame, so that bandwidth resources provided by the database meet bandwidth requirements for recording the first video frame and the second video frame into the database.

3. The vehicle event data recorder of claim 1, wherein the original video frame is a wide image.

4. The vehicle event data recorder of claim 1, wherein the first image-processing circuit comprises:
   a first image-capturing circuit, having an input terminal coupled to the photography module to receive the original video frame, and configured to capture a first sub-frame from the original video frame; and
   a first image-scaling circuit, having an input terminal coupled to an output terminal of the first image-capturing circuit, and configured to adjust resolution of the first sub-frame to obtain the first video frame.

5. The vehicle event data recorder of claim 1, wherein the first image-processing circuit performs image recognition to find out an object on the original video frame and captures a first sub-frame comprising the object from the original video frame.

6. The vehicle event data recorder of claim 5, wherein the object is a vehicle, a license plate or a human face.

7. The vehicle event data recorder of claim 1, wherein the second image-processing circuit comprises:
   a second image-capturing circuit, having an input terminal coupled to the photography module to receive the original video frame, and configured to capture a second sub-frame from the original video frame; and
   a second image-scaling circuit, having an input terminal coupled to an output terminal of the second image-capturing circuit, and configured to adjust resolution of the second sub-frame to obtain the second video frame.

8. The vehicle event data recorder of claim 1, wherein the first image-processing circuit generates the first video frame according to all of the original video frame; the first image-processing circuit performs image recognition to find out a position of an object on the original video frame, and provides the position of the object to the second image-processing circuit; and, according to the position of the object provided by the first image-processing circuit, the second image-processing circuit captures a second sub-frame comprising the object from the original video frame to obtain the second video frame.

9. The vehicle event data recorder of claim 1, further comprising:
   a third image-processing circuit, coupled to the photography module to receive the original video frame, configured to capture the original video frame at a third view angle to generate a third video frame, and recording the third video frame into the database, wherein the third view angle of the third video frame is different from the first view angle of the first video frame and the second view angle of the second video frame.

10. An operation method of a vehicle event data recorder, comprising:
    capturing a scene and generating an original video frame by a photography module;
    generating a first video frame by capturing the original video frame at a first view angle and recording the first video frame into a database by a first image-processing circuit; and
    generating a second video frame by capturing the original video frame at a second view angle and recording the second video frame into the database by a second image-processing circuit, wherein the second view angle of the second video frame is different from the first view angle of the first video frame,
    wherein the first image-processing circuit and the second image-processing circuit directly and simultaneously receive the original image data from the photograph module.

11. The operation method of a vehicle event data recorder of claim 10, wherein the first image-processing circuit and the second image-processing circuit respectively adjust resolution of the first video frame and resolution of the second video frame to make the resolution of the first video frame and the resolution of the second video frame lower than resolution of the original video frame, so that bandwidth resources provided by the database meet bandwidth requirements for recording the first video frame and the second video frame into the database.

12. The operation method of a vehicle event data recorder of claim 10, wherein the original video frame is a wide image.

13. The operation method of a vehicle event data recorder of claim 10, wherein the step of generating the first video frame comprises:
    capturing a first sub-frame from the original video frame; and
    adjusting resolution of the first sub-frame to obtain the first video frame.

14. The operation method of a vehicle event data recorder of claim 10, wherein the step of generating the first video frame comprises:

performing image recognition to find out an object on the original video frame; and capturing a first sub-frame comprising the object from the original video frame.

15. The operation method of a vehicle event data recorder of claim 14, wherein the object is a vehicle, a license plate or a human face.

16. The operation method of a vehicle event data recorder of claim 10, wherein the step of generating the second video frame comprises:

capturing a second sub-frame from the original video frame; and adjusting resolution of the second sub-frame to obtain the second video frame.

17. The operation method of a vehicle event data recorder of claim 10, wherein the step of generating the first video frame comprises:

generating the first video frame according to all of the original video frame; and performing image recognition to find out a position of an object on the original video frame, and providing the position of the object to the second image-processing circuit; and wherein the step of generating the second video frame comprises:

according to the position of the object provided by the first image-processing circuit, capturing a second sub-frame comprising the object from the original video frame to obtain the second video frame.

18. The operation method of a vehicle event data recorder of claim 10, further comprising:

generating a third video frame by capturing the original video frame at a third view angle and recording the third video frame into the database by a third image-processing circuit, wherein the third view angle of the third video frame is different from the first view angle of the first video frame and the second view angle of the second video frame.

\* \* \* \* \*